Oct. 6, 1925.
1,556,030
J. G. REDSHAW
WINDSHIELD CLEANER AND HEATER
Filed Oct. 1, 1924
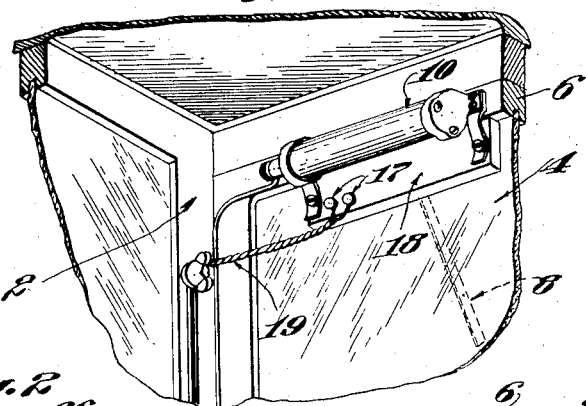
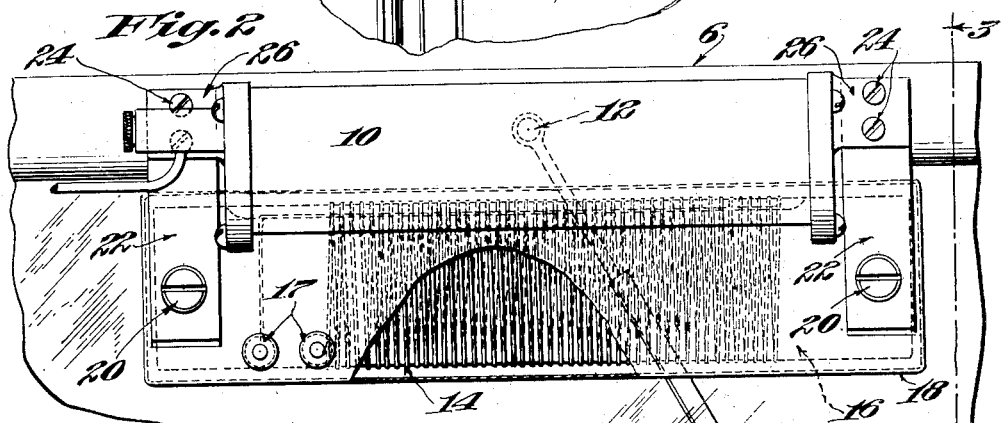
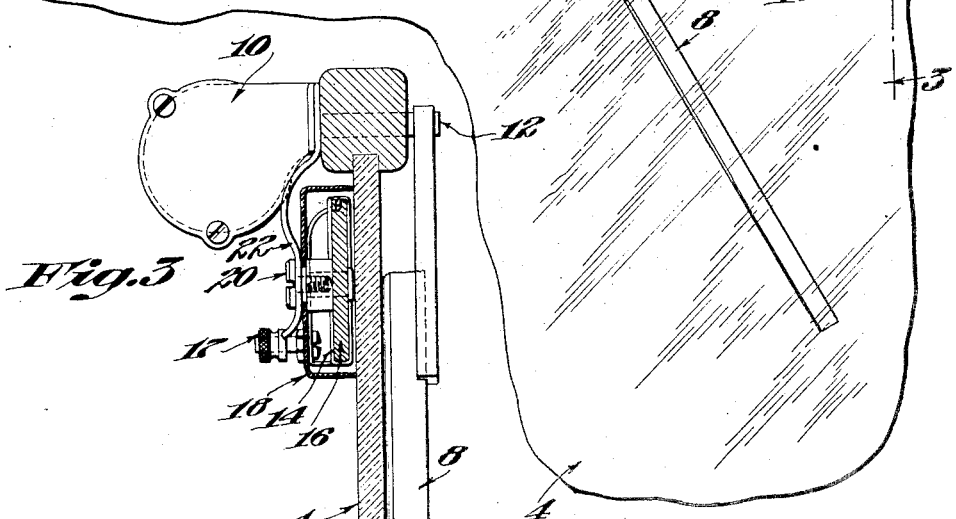
Inventor
J. G. Redshaw
by David Rines
his Atty Patented Oct. 6, 1925.

1,556,030

UNITED STATES PATENT OFFICE.

JOSEPH G. REDSHAW, OF LYNN, MASSACHUSETTS.

WINDSHIELD CLEANER AND HEATER.

Application filed October 1, 1924. Serial No. 741,086.

*To all whom it may concern:*

Be it known that I, JOSEPH G. REDSHAW, a citizen of the United States, and a resident of Lynn, in the county of Essex and Commonwealth of Massachusetts, have invented a new and useful Improvement in Windshield Cleaners and Heaters, of which the following is a specification.

The present invention relates to window-cleaning devices, and more particularly to devices for cleaning or wiping the windshields of automobiles.

Windshield wipers have now been in use for several years. They operate very satisfactorily in mild weather. In cold weather, however, the freezing rain, mist, wet snow, and the like, that tend to accumulate upon the windshield are a far more serious obstruction to the driver's view than the dirt and the débris that the windshield wiper is designed to remove. The windshield wiper is wholly unable to loosen or remove such materials, and it becomes, at such times, unable also to perform its ordinary function of removing the dirt obstructions as well. In fact, the wiper tends to stick or freeze to the glass and to become wholly inoperative.

Window heaters have heretofore been proposed for heating the windows of houses or vehicles and the windshields of automobiles. In the case of automobiles, these proposals have met with failure. The energy that may be generated or supplied from the power available upon an automobile is very small, and cannot, therefore, be utilized to heat more than a very small portion of the windshield. Such heating means, furthermore, would have to be placed directly in the driver's line of vision, which would obstruct his view, and even then, the heat generated would not be sufficient to produce a clear view. The use of such heating means alone, moreover, would not serve to clear the windshield of the dirt and dust that accumulates so incessantly and that is such a troublesome factor.

According to the present invention, a small heating unit is provided, in combination with a windshield wiper, the heating unit acting to soften or melt the snow or break up the freezing rain drops sufficiently to enable the windshield wiper to remove it just as it would any other view-obstructing deposit.

The invention will now be explained more at length in connection with the accompanying drawings, in which Fig. 1 is a perspective view of a portion of an automobile, showing a preferred embodiment of the present invention applied thereto; Fig. 2 is a detail rear view, partly broken away, upon a large scale, of a portion of the windshield shown in Fig. 1, with the invention attached thereto; and Fig. 3 is a section taken upon the line 3—3 of Fig. 2, looking in the direction of the arrows.

The invention is not necessarily limited in its use to automobiles, but an automobile 2 is shown in the drawings for illustrative purposes. The automobile 2 is shown equipped with the customary, vertically disposed, windshield 4 upon the upper frame portion 6 of which is mounted a windshield wiper 8 and a motor 10 for actuating the wiper. In the illustrated embodiment, the motor 10 pivotally oscillates the wiper shaft 12. The details of construction of the motor 10 are not illustrated as they do not, of themselves, form any part of the present invention, and in fact, it is within the scope of the present invention to operate the wiper by hand. The wiper is thus actuated back and forth through a comparatively small, restricted area of the windshield, shown in Fig. 1 as adjacent to the upper, left-hand corner, and through which the chauffeur views the road ahead.

At the upper portion of this restricted area, and above the chauffeur's line of sight, an electric heating coil 14 is mounted. This heating coil may be wound about an insulator 16. The heating coil may, if desired, be positioned entirely to one side of the insulator 16, next to the windshield, the better to heat the windshield. The heating coil may, in fact, be molded into the glass of the windshield. The terminals 17 of the coil may be connected by conductors 19 through a switch (not shown) to some convenient source of power, such as a battery, or the automobile generator. The heat thus supplied by the heating coil is amply sufficient to heat a sufficient portion of the said restricted area of the windshield to a degree such that freshly deposited snow, or newly freezing rain or mist will be softened or melted. The wiper 8 will be enabled to push this snow or rain to one side, and thus prevent the formation of obstacles in the driver's view.

In order that the heating coil may not interfere with the operation of the wiper 8,—shown on the outside of the windshield 4,—it is mounted on the inside of the windshield. To protect the heating coil against injury, dust and the like, it is mounted in a case 18. The case 18 is secured by screws 20 to arms 22 that are fastened by screws 24 to the frame portion 6 of the windshield. These same screws 24 may be used also to fasten the wiper motor 10 to the frame portion 6, and to this end the motor 10 is provided with side extensions 26 that lap over the arms 22, as illustrated. A very convenient arrangement is thus provided the parts of which operate in combination without interfering with each other in any way.

The invention is not, of course, limited to the exact details of construction that are illustrated and described herein. Modifications will readily occur to persons skilled in the art, and all such are considered to fall within the spirit and scope of the present invention, as defined in the appended claims.

What is claimed is:

1. The combination with a window, of means for heating the window to soften hardened aqueous matter upon the window, and means for wiping the window to easily remove the softened matter.

2. In an automobile having a power plant and a windshield, the combination of means for heating the windshield to soften hardened aqueous matter upon the windshield, means connecting the heating means to the power plant, and means for wiping the windshield to easily remove the softened matter.

3. In an automobile having a power plant and a windshield, the combination of an electric heater for heating the windshield to soften hardened aqueous matter upon the windshield, means connected to the power plant for supplying the heater with electric energy, a mechanical wiper for wiping the windshield to easily remove the softened matter, and means for operating the wiper.

4. In an automobile having a power plant and a windshield, the combination of an electric heater for heating the windshield to soften hardened aqueous matter upon the windshield, mounted upon the windshield to one side of the line of sight of the chauffeur, means connected to the power plant for supplying the heater with electric energy, a mechanical wiper mounted upon the windshield to easily remove the softened matter, and means for operating the wiper.

5. In an automobile having a windshield, means mounted upon one side of the windshield for heating the windshield to soften hardened aqueous matter upon the windshield, and means mounted upon the other side of the windshield for wiping the windshield to easily remove the softened matter.

6. In an automobile having a power plant and a vertically disposed windshield having an upper frame portion, the combination of an electric heater mounted upon the frame portion upon one side of the windshield just above the line of sight of the chauffeur for heating the windshield to soften hardened aqueous matter upon the windshield, means connected to the power plant for supplying the heater with electric energy, a mechanical wiper mounted upon the frame portion upon the other side of the windshield for wiping the windshield to easily remove the softened matter, and a motor for operating the wiper mounted upon the frame portion upon the first-named side of the windshield.

In testimony whereof, I have hereunto subscribed my name this 18th day of September 1924.

JOSEPH G. REDSHAW.